March 26, 1940.     B. D. McINTYRE     2,194,832
STABILIZER FOR VEHICLES
Filed Feb. 6, 1939
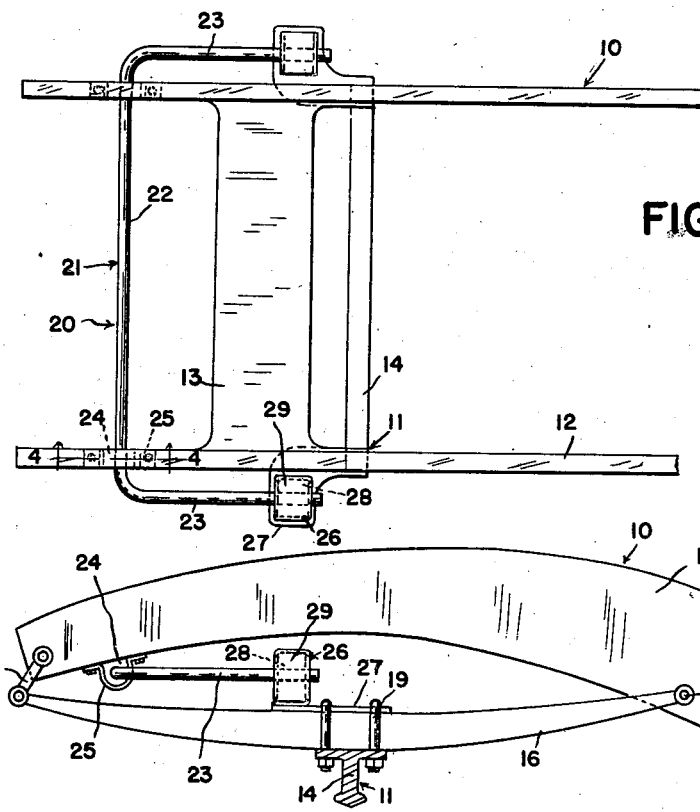
FIG.1.
FIG.2.
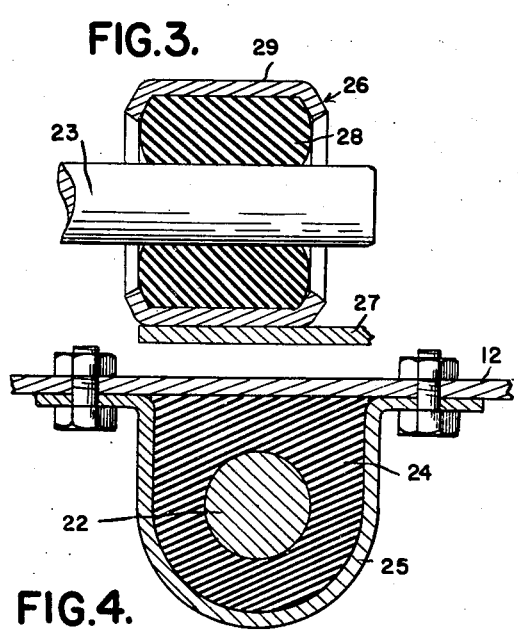
FIG.3.
FIG.4.
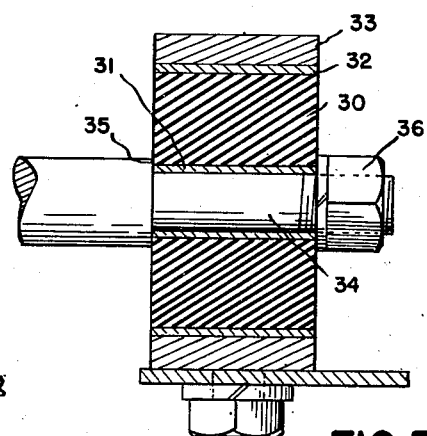
FIG.5.
INVENTOR.
BROUWER D. McINTYRE
BY
ATTORNEYS

UNITED STATES PATENT OFFICE 2,194,832

STABILIZER FOR VEHICLES

Brouwer D. McIntyre, Monroe, Mich., assignor to Monroe Auto Equipment Company, Monroe, Mich., a corporation of Michigan Application February 6, 1939, Serial No. 254,939

2 Claims. (Cl. 267—11)

This invention relates generally to stabilizing equipment for motor vehicles and refers more particularly to stabilizers of the type having a torsion bar mounted on either the sprung or unsprung assembly of the vehicle for rocking movement and having laterally projecting arms at opposite ends of the bar directly pivoted to the other assembly in a manner to resist relative deflection of the suspension springs at opposite sides of the vehicle to maintain the normal plane of the body of the vehicle substantially parallel with the plane of the axle when the vehicle is turned in either direction from a straight line course of travel.

One of the principal objects of this invention consists in the provision of improved means for mounting a torsion bar of the above type on a vehicle in a manner to not only permit the bar to perform its intended function of resisting "roll" of the sprung assembly, but to also compensate for any difference that may exist in the paths of travel of the arms on the bar and the part of the vehicle to which the ends of the arms are connected. In accordance with the present invention, the free end portions of the arms are connected to one of the vehicle assemblies through the medium of resilient blocks, preferably of rubber material, in a manner that any difference existing between the paths of travel of the ends of the arms on the bar and the part of the vehicle assembly supporting the mounting blocks for the arms is compensated for by deformation, or interparticle flow of the resilient material from which the blocks are formed. As a result, the wear on the blocks is reduced to a minimum and the connection will remain in a serviceable condition over a long period of use.

A further advantageous feature of this invention resides in the provision of a torsion bar of the character set forth wherein the bar, as well as the free ends of the arms on the latter, are respectively connected to the relatively movable vehicle assemblies through the medium of blocks formed of rubber material. As a result, the bar may be considered as mounted in rubber, and this is desirable in that no lubrication is required and in that there is no tendency for objectionable noise to develop.

With the foregoing, as well as other objects in view, the invention resides in the novel construction of the mounting which will be made more apparent as this description proceeds, especially when considered in connection with the accompanying drawing, wherein—

Figure 1 is a plan view of a portion of a motor vehicle equipped with a sway eliminator assembly constructed in accordance with this invention;

Figure 2 is a side elevational view of a portion of the construction shown in Figure 1;

Figure 3 is an enlarged sectional view illustrating the connection provided between the free ends of the arms on the torsion bar and the part of the vehicle to which these arms are connected;

Figure 4 is an enlarged sectional view taken substantially on the plane indicated by the line 4—4 of Figure 1;

Figure 5 is an enlarged sectional view of a slightly modified form of mounting for the free ends of the arms on the torsion bar.

Referring now more in detail to the drawing, it will be noted that there is illustrated in Figure 1 a portion of a vehicle having a sprung assembly 10 and having an unsprung assembly 11. In the present instance, the sprung assembly comprises a frame 12 having laterally spaced longitudinally extending side sills secured in assembled relation to each other by suitable cross members 13. The unsprung assembly 11 comprises an axle 14 extending transversely of the frame 12 beneath the same and adapted to carry road engaging wheels (not shown) at opposite ends thereof. Although various different types of suspension springs may be employed without departing from the spirit and scope of this invention, nevertheless, for the purpose of illustration, I have shown the sprung assembly 10 as supported from the unsprung assembly 11 by means of orthodox semi-elliptical leaf springs 16 extending longitudinally of the frame 12 at opposite sides thereof. In accordance with conventional practice, the forward ends of the springs are suitably pivotally connected to the side sills of the frame 12 by means of pins 17 and the rear ends of the springs are connected to the side sills of the frame 12 through the medium of shackles 18. The intermediate portions of the springs 16 are shown in Figure 2 as rigidly secured to the axle 14 adjacent opposite ends thereof by means of U-bolts 19.

In vehicles equipped with the general construction outlined above, the sprung weight tends to roll relative to the unsprung assembly when the vehicle is turned in either direction from a straight line course of travel and the extent of roll depends, of course, upon the speed of the vehicle, as well as the flexibility of the particular springs employed. In accordance with the present invention, "side swaying" or roll of the sprung weight of the vehicle is eliminated, or at least substantially minimized by a torsional stabilizer 20 comprising a substantially U-shaped spring steel bar 21 mounted upon one of the aforesaid assemblies, with the base section 22 extending transversely of the vehicle and with the arms 23 directly pivotally connected to the other assembly. Although it is immaterial insofar as the principle of operation of the present invention is concerned which of the assemblies is selected for mounting the torsion bar 21, nevertheless, for the purpose of illustrating the present invention, I have shown the bar 21 as mounted on the sprung assembly 10 and as having the extremities of the arms 23 directly pivotally connected to the unsprung assembly 11 or axle 14 of the vehicle.

In detail, the base section 22 of the U-shaped torsion bar 21 extends transversely of the frame 12 beneath the latter and the opposite ends of the base section are respectively mounted on the undersides of the laterally spaced sills of the frame for rocking movement. Upon reference to Figure 4, it will be noted that the mountings for connecting the opposite end portions of the base section 22 of the bar to the frame 12 are identical, and each mounting comprises a block 24 of resilient material, such as rubber, clamped to the frame 12 by means of a suitable strap 25. The blocks 24 are apertured to receive the base portion 22 of the torsion bar and, if desired, may be vulcanized to the base portion 22 of the bar so that rocking movement of the latter is permitted by deformation or interparticle flow of the rubber from which the blocks 24 are formed. With this construction, the wear on the blocks 24 is reduced to the minimum and a noiseless mounting results which requires no attention. In the event it is not desired to vulcanize the blocks 24 to the bar, the same results may be obtained by forming the openings through the blocks of smaller diameter than the bar so that after the bushings are forced on the bar, the latter grip the bar sufficiently to prevent slippage between the blocks and bar.

The free ends of the arms 23 are connected to the unsprung assembly 11 by mountings 26 respectively secured to the top surfaces of the springs 16 at opposite sides of the frame 12 by means of brackets 27 having portions clamped to the springs by the U-bolts 19. Each mounting 26 comprises a block 28 of resilient material, such as rubber, assembled in a retainer 29 which, in turn, is welded, or otherwise permanently secured to the brackets 27. The blocks 28 are provided with openings therethrough for receiving the free ends of the arms 23 and may be secured to the arms 23, either by vulcanizing the blocks directly to the arms, or by compressing the blocks so that they frictionally engage, or grip the free ends of the arms. In either case, the arrangement is such that relative movement between the arms 23 and the blocks 28 is effected by interparticle flow of the material from which the blocks are formed, and this is desirable in that it reduces the wear to the minimum.

It will be noted that upon spring deflection, the mountings 26 are compelled to assume the path of travel of the springs, and this path of travel varies to some extent with reference to the path of swinging movement through which the free ends of the arms 23 tend to travel. The difference between the two paths of travel, mentioned above, is compensated for without interfering with either the operation of the torsion bar, or the mountings therefor by the resilient blocks 28. In other words, the blocks 28 deform sufficiently to take care of any variations between the paths of travel of the free ends of the arms 23 and the paths of travel of the mounting brackets 27.

The embodiment of the invention illustrated in Figure 5 differs from the one previously described in the type of mounting provided for attaching the free ends of the arms 23 to the unsprung assembly of the vehicle. In detail, the mounting shown in Figure 5 comprises a cylindrical block 30 of resilient material, such as rubber, having a central bore therethrough for receiving a metal sleeve 31 and vulcanized to the sleeve. The periphery of the block 30 is sleeved within a metal bushing 32 of the proper diameter and is vulcanized to this bushing to provide a unitary construction.

The bushing 32 is adapted to have a pressed fit with a bushing 33 which, in turn, is suitably secured to the unsprung assembly. It will, of course, be understood that a mounting of this type is located on each side of the vehicle for connecting the free ends of the arms on the torsion bar to the unsprung assembly. In this connection, it will be noted that the extremities of each of the arms are formed with a reduced portion 34 forming a shoulder 35 and adapted to slidably engage in the sleeve 31 of the mounting. The extremity of the reduced portion of each arm is threaded for receiving a clamping nut 36 and the latter functions to secure the free ends of the arms to the unsprung weight through the mountings. This embodiment of the invention functions in substantially the same manner as the first described form of the invention in that the rubber blocks 30 are permitted to deform to the extent required to compensate for the different paths of travel of the free ends of the arms on the torsion bar and the bushings 33 on the unsprung assembly.

In operation, it will be noted that relative movement between the sprung and unsprung assemblies at one side of the vehicle is transmitted through the spring torsion bar 21 tending to effect a similar relative movement between these assemblies at the opposite side of the vehicle. In other words, as the suspension means at one side of the vehicle tends to deflect relative to the suspension means at the opposite side of the vehicle, the latter suspension means will react through the torsion bar to resist deflection of the other suspension means. This has the effect of maintaining the normal plane of the body of the vehicle substantially parallel to the plane of the axle when the vehicle is turned in either direction from a straight line course of travel.

What I claim as my invention is:

1. In a motor vehicle having sprung and unsprung assemblies, a stabilizer for the sprung assembly comprising a torsion bar mounted on one of the assemblies for rocking movement, arms projecting laterally from the bar at points spaced from each other longitudinally of the bar and having the free end portions thereof directly connected to the other assembly, the free ends of the arms and the points of connection of the latter to the said other assembly being movable throughout different paths of travel, and means directly connecting the free end portions of the arms to the said other assembly including blocks of rubber material mounted on the said other assembly and having bores therethrough extending in the direction of the arms to receive the free end portions of said arms, the surfaces of the bores being held against the end portions of the arms to resist slippage of the end portions of the arms relative to the blocks and the outer portions of the blocks being fixed to the said other assembly, whereby said blocks are placed under a shearing stress during movement of the arms and blocks about their respective paths of travel.

2. In a motor vehicle having sprung and unsprung assemblies, a one-piece substantially U-shaped stabilizer bar having the base portion mounted on one of the assemblies for rocking movement and having the free ends of the arm portions directly connected to the other assembly, the free ends of the arms and the points of connection of the latter to the said other assembly being movable throughout different paths of travel, means directly connecting the free ends of the arms to the said other assembly including blocks of rubber material having bores therethrough extending in the direction of the arms for receiving the free end portions of the arms and held against the free end portions of the arms to resist slippage of the arms relative to the blocks, and housings for the rubber blocks secured to the said other assembly and holding the outer portions of the blocks fixed with respect to the said other assembly whereby the rubber blocks are placed under a shearing stress during movement of the free end portions of the arms and housings throughout their respective paths of travel.

BROUWER D. McINTYRE.